United States Patent [19]

Hempelmann

[11] Patent Number: 4,749,234
[45] Date of Patent: Jun. 7, 1988

[54] ANTI-ROTATION/RETENTION CLIP FOR WHEEL TRIM

[75] Inventor: Heinrich J. Hempelmann, Livonia, Mich.

[73] Assignee: NI Industries, Inc., Novi, Mich.

[21] Appl. No.: 812,072

[22] Filed: Dec. 23, 1985

[51] Int. Cl.⁴ ............................................. B60B 7/06
[52] U.S. Cl. .......................... 301/37 CD; 301/37 SS; 301/37 R; 301/37 PB
[58] Field of Search ............... 301/37 R, 37 S, 37 SC, 301/37 SS, 37 C, 37 CD, 37 P, 37 PB

[56] References Cited

U.S. PATENT DOCUMENTS

| | | |
|---|---|---|
| 2,774,633 | 12/1956 | Lyon . |
| 2,815,986 | 12/1957 | Landell . |
| 2,847,251 | 8/1958 | Lyon . |
| 2,864,654 | 12/1958 | Hurd . |
| 2,901,291 | 8/1959 | Lyon . |
| 2,982,581 | 5/1961 | Lyon . |
| 3,020,090 | 2/1962 | Lyon . |
| 3,037,817 | 6/1962 | Spisak . |
| 3,042,453 | 7/1962 | Lyon . |
| 3,043,632 | 7/1962 | Wagner . |
| 3,071,416 | 1/1963 | Leich . |
| 3,096,124 | 7/1963 | Frame et al. . |
| 3,199,921 | 8/1965 | Boroday et al. . |
| 3,988,040 | 10/1976 | Spisak . |
| 4,361,359 | 11/1982 | Binnewies et al. ............ 301/37 PB |
| 4,452,493 | 6/1984 | Liggett ........................... 301/37 SS |

FOREIGN PATENT DOCUMENTS

| | | | |
|---|---|---|---|
| 54-102729 | 8/1979 | Japan ............................. 301/37 SS |
| 2110610A | 6/1983 | United Kingdom . | |
| 2118491 | 11/1983 | United Kingdom ........... 301/37 SS |
| 2169250A | 7/1986 | United Kingdom . | |

*Primary Examiner*—James B. Marbert
*Attorney, Agent, or Firm*—Harness, Dickey & Pierce

[57] ABSTRACT

A wheel trim retention system is disclosed herein which incorporates an anti-rotation clip which is adapted to be secured to the peripheral portion of a wheel trim and to cooperatingly engage portions of a vehicle wheel so as to prevent relative rotation between the wheel trim and the vehicle wheel. The anti-rotation clip comprises first and second portions each of which are adapted to engage and be compressed between generally opposed surfaces of the vehicle wheel whereby the force of engagement of one of these surfaces with the vehicle wheel is increased by the action of the engagement of the other of these surfaces within an opposed portion of the vehicle wheel. The first of these portions includes circumferentially spaced radially outwardly turned end portions which are adapted to engage a radially inwardly facing surface of the vehicle wheel so as to inhibit relative rotation between the trim member and wheel.

14 Claims, 2 Drawing Sheets

U.S. Patent   Jun. 7, 1988   Sheet 2 of 2   4,749,234
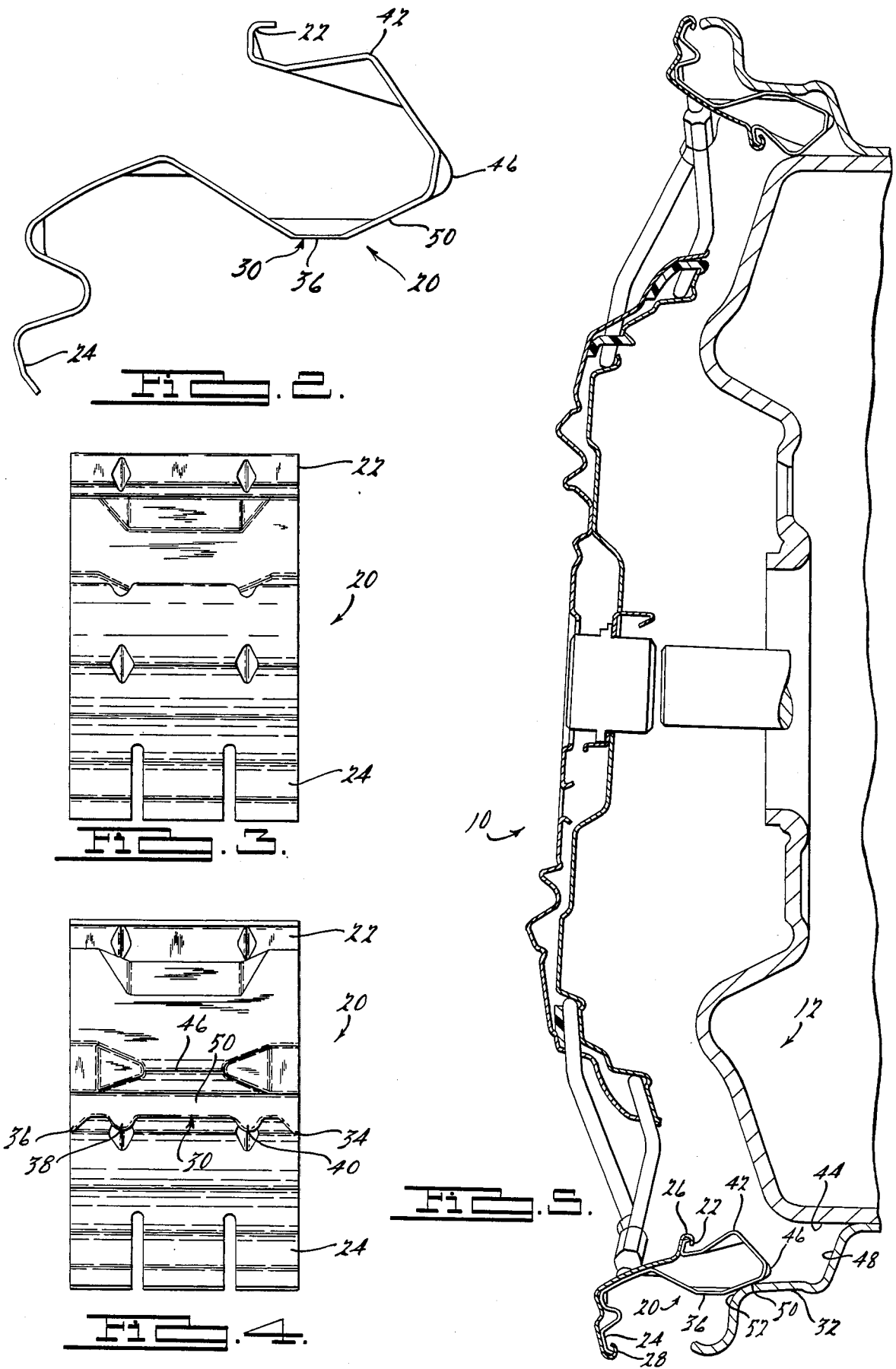

ANTI-ROTATION/RETENTION CLIP FOR WHEEL TRIM

BACKGROUND AND SUMMARY OF THE INVENTION

The present invention relates generally to wheel trim retention systems and more specifically to an anti-rotation clip for use in conjunction with such wheel trim retention systems.

Wheel trim have long been employed to ornamate the axially outwardly facing surface of vehicle wheels in order to enhance the overall appearance of the motor vehicle. Typically, such decorative wheel trim are offered as additional cost options when purchasing a motor vehicle and are often relative costly and hence frequently subject to theft. In order to reduce the likelihood of theft of such wheel trim, many wheel trim manufacturers have designed and now incorporate combination center lock retention systems which comprise cooperating central fastening means employing a first fastening means secured to the axially outwardly facing surface of the vehicle wheel in a suitable manner which cooperate with a second fastener member provided on the wheel trim so as to both retain the wheel trim in position on the vehicle wheel and to render removal thereof more difficult so as to deter possible theft thereof. However, one problem presented by such center retention systems is the need to prevent relative rotation between the vehicle wheel and the trim member. It is important to insure that once the wheel trim is positioned on the vehicle wheel, relative movement therebetween is substantially prevented because typically such wheel trim will incorporate an opening through which the valve stem extends. It is also extremely desirable to provide such relative rotation inhibiting means which are relatively low in cost so as not to result in substantial increase in the price of the wheel trim themselves and further does not otherwise interfere with or render installation and removal of the wheel trim from the vehicle wheel excessively difficult.

Accordingly, the present invention incorporates a relatively simple, easily fabricated anti-rotation clip which is designed to be easily and conveniently secured to the peripheral portion of the wheel trim member and includes portions which are engageable with the vehicle wheel and cooperate therewith so as to effectively inhibit relative rotation therebetween. The anti-rotation clip of the present invention incorporates a first generally radially outwardly facing surface which is adapted to engage the generally radially inwardly facing surface of the axially extending flange portion of the vehicle wheel so as to prevent relative rotation therebetween. Another portion of the clip disposed radially inwardly from this first portion is also adapted to engage a spaced generally radially outwardly facing surface portion of the vehicle wheel and to cooperate therewith so as to back up or increase the force of engagement between the first portion and the generally radially inwardly facing surface of the vehicle wheel thereby increasing the effectiveness of the rotation preventing engagement therebetween. The clip also incorporates an intermediate portion positioned axially inwardly of the above referenced portions which engages another generally axially outwardly facing portion of the vehicle wheel and serves to aid in axially positioning the peripheral portion of the vehicle wheel so as to thereby substantially prevent annoying rattle which may occur were the peripheral portion of the wheel trim allowed to move into engagement with the vehicle wheel and/or balancing weights which may be applied thereto. Preferably, a plurality of these clips will be secured to the trim member in circumferentially spaced relationship around the periphery of the wheel trim and will cooperate with the vehicle wheel upon assembly of the trim thereto so as to effectively prevent relative rotation therebetween while the center retention portion operates to securely restrain the wheel trim against axial movement. A generally radially and axially outwardly extending camming surface is also provided extending between the rotation inhibiting surface and the axial locating surface which operates to provide a damming action to facilitate movement of the anti-rotation clip into its slightly compressed operative position during installation of the wheel trim on the vehicle wheel.

Additional advantages and features of the present invention will become apparent from the subsequent description and the appended claims taken in conjunction with the accompanying drawings.

BRIEF DESCRIPTION OF THE DRAWINGS

FIG. 2 is an enlarged side view of the anti-rotation clip shown in FIG. 1;

FIG. 3 is an elevational view of the anti-rotation clip of the present invention as seen locking in a generally axially inward direction with respect thereto;

FIG. 4 is an elevational view of the anti-rotation clip in accordance with the present invention as seen looking in a generally axially outward direction; and FIG. 5 is a section view of a wheel trim incorporating an anti-rotation clip in accordance with the present invention shown in a partially installed relationship to a vehicle wheel, the section being taken along a radial plane extending generally parallel to the axis of rotation thereof.

DESCRIPTION OF THE PREFERRED EMBODIMENT

Figure 1:
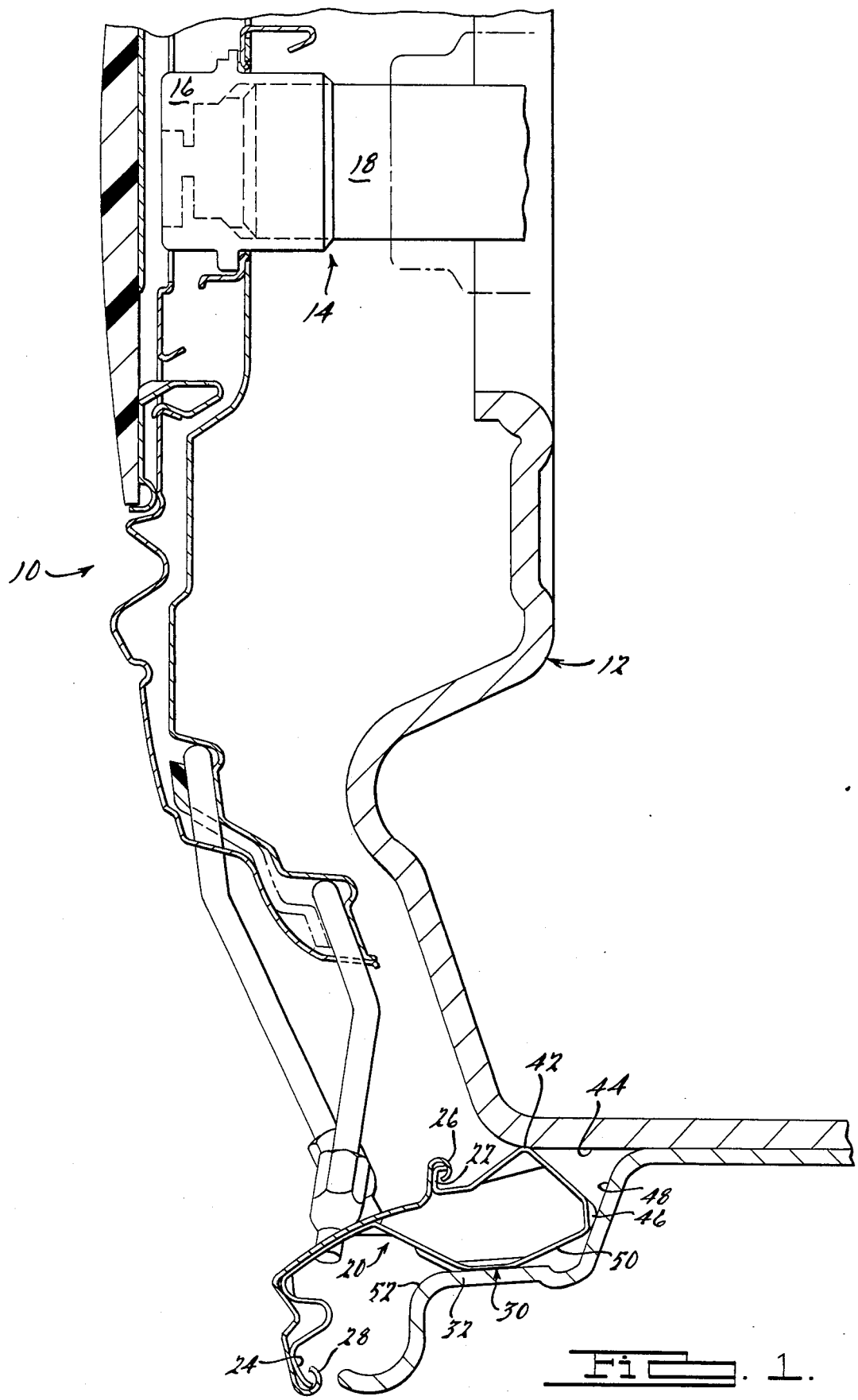
FIG. 1 is an enlarged fragmentary section view of the wheel trim incorporating an anti-rotation clip in accordance with the present invention shown in installed relationship to a portion of a vehicle wheel, the section being taken along a radial plane lying along the axis of rotation thereof.

Referring now to the drawings and in particular to FIG. 1, there is illustrated a wheel trim indicated generally at 10 which is designed to be secured to the axially outwardly facing surface of the vehicle wheel 12 by means of a center anti-theft retention system 14. The center anti-theft retention system 14 may be generally of the type illustrated and disclosed in copending application Ser. No. 465,222, entitled "Wheel Retention System", filed Feb. 15, 1983 now U.S. Pat. No. 4,576,415 and will typically comprise a center fastener member 16 provided on the wheel trim 10 which is designed to threadedly engage and cooperate with a corresponding threaded member 18 secured to the axially outwardly facing surface of the vehicle wheel 12 or alternatively secured to a rotating portion of the vehicle hub. Such center retention arrangements offer a secure means for retaining the wheel trim on the axially outwardly facing surface of the vehicle wheel as well as an effective means for deterring theft thereof in that they generally require the use of a specially coded wrench for installation and/or removal of the threaded fastener.

However, because such retention systems are located at the rotational axis of the vehicle wheel, it is necessary to provide some means on the trim member to prevent relative rotation between the trim member and associated vehicle wheel.

In order to prevent such relative rotation, wheel trim 10 is provided with a plurality of circumferentially spaced anti-rotation clips indicated generally at 20 which are secured to the peripheral edge portion of the trim member 10. As shown therein, anti-rotation clip 20 includes opposite end portions 22, 24 which are designed to be secured to generally radially inner and outer portions of the trim member 10 such as by rolling or crimping edge portions 26, 28 of the trim member 10 thereover so as to clamp these end portions therebetween.

The anti-rotation clip 20 includes a generally axially extending radially outwardly facing first surface portion 30 which is adapted to engage a generally axially extending radially inwardly facing flange portion 32 of the vehicle wheel 12. As best seen with reference to FIG. 4, this first wheel engaging surface portion 30 has the opposite lateral edges 34, 36 thereof flared slightly in a radially outward direction so as to provide an axially elongated biting edge portion to engage the corresponding flange portion 32 of the vehicle wheel 12. A pair of generally parallel radially extending reinforcement embossments 38, 40 may also be provided spaced slightly inwardly from each of these radially outwardly flared edge portions 34, 36 and will serve to stiffen and rigidify the engagement with the vehicle wheel 12. It should be noted, however, that it is important that these embossments be sized so as to avoid engagement with the vehicle wheel when the clip is assembled thereto as such engagement may restrict the force of engagement between the edge portions 34, 36 and flange 32.

The clip also includes a second portion 42 adapted to engage a generally radially outwardly facing surface portion 44 of the wheel spider. This second portion 42 operates to provide a back up and to further urge the first portion 30 into engagement with the radially inwardly facing flange portion 32 of the wheel 12 so as to insure an effective rotation inhibiting engagement therebetween. Preferably, the radial spaced between these first and second wheel engaging portions 30 and 42 will be slightly greater than the relative spacing between the correspondingly engaged surfaces 32 and 44 of the vehicle wheel whereby upon installation of the wheel trim having such anti-rotation clips a compressive force will be exerted on the clip member 20 by the respective portions 32 and 44 of the wheel thereby operating to increase the force of engagement primarily between the first portion 30 and the radially inwardly facing flange portion 32 of the vehicle wheel 12.

The clip member 20 is also provided with an axial locating portion 46 disposed between the first and second wheel engaging portions 30 and 42 and located generally axially inwardly therefrom. As illustrated, the axial locating portion 46 of the clip member 20 is designed to engage a generally axially outwardly facing surface 48 of the vehicle wheel 12 and to cooperate therewith so as to position the peripheral portion of the trim member in relatively closely spaced relationship with respect to the vehicle wheel. In this manner, the possibility of annoying noise generating rattling of the trim member against the vehicle wheel or balancing weights secured to the wheel is substantially eliminated.

A camming surface portion 50 is also provided on anti-rotation clip 20 extending generally radially and axially outwardly from axial locating portion 46 to the first wheel engaging portion 30. As best seen with reference to FIG. 5 of the drawings, camming surface 50 serves to facilitate installation of the wheel tirm 10 on the vehicle wheel 12 by providing an inclined ramp engageable with the outer shoulder 52 of the vehicle wheel which serves to guide the clip 20 thereover and into the fully installed position shown in FIG. 1 wherein it is slightly compressed as a result of the engagement of surfaces 30 and 42 with corresponding portions 32 and 44 of the vehicle wheel. This is particularly advantageous when the wheel trim 10 is initially positioned in an inclined relationship with the vehicle wheel as is shown in FIG. 5 as the axially inward portions of the clip 20 are moved through an arc as the trim member 10 is installed on the vehicle wheel.

While it will be apparent that the preferred embodiments of the invention disclosed are well calculated to provide the advantages and features above stated, it will be appreciated that the invention is susceptible to modification, variation and change without departing from the proper scope of fair meaning of the subjoined claims.

I claim:

1. An anti-rotation clip for use in inhibiting relative rotation between a wheel trim and associated vehicle wheel, said clip including:
   a first portion engageable with said vehicle wheel and operative to axially position the outer periphery of said wheel trim with respect thereto;
   second and third portions each spaced from said first portion and engageable with generally opposed surfaces of said vehicle wheel and compressed thereby, one of said second and third portions including radially flared circumferentially spaced lateral edge portions, the other of said second and third portions cooperating with said one portion to aid in urging said edge portions against said engaged portion of said wheel to inhibit relative rotation between said wheel trim and said vehicle wheel; and
   said clip further including end portions adapted to be secured to peripheral flange portions of said wheel trim.

2. A clip as set forth in claim 1 wherein said clip further includes a cam surface engageable with said vehicle wheel during installation of said wheel trim thereon, said cam surface being operative to guide movement of said one of said second and third portions into an installed position with respect to said wheel.

3. A clip as set forth in claim 2 wherein said cam surface extends between said first portion and said one of said second and third portions of said clip.

4. A clip as set forth in claim 1 wherein said second and third portions are generally radially spaced from each other.

5. A clip as set forth in claim 1 wherein said first portion is positioned between said second and third portions.

6. A clip as set forth in claim 1 wherein said first position is disposed axially inwardly of said second and third portions.

7. A retention system for securing a wheel trim to an axially outwardly facing surface of a vehicle wheel, said retention system comprising:

center fastening means associated with said wheel trim;

cooperating fastening means associated with said vehicle wheel and cooperating with said center fastening means to restrain said wheel trim against axial movement away from said vehicle wheel; and a plurality of anti-rotation clips each having generally axially outwardly extending opposite end portions secured to peripheral flange portions of said trim, said clips being spaced around a peripheral portion of said wheel trim, each of said anti-rotation clips including:

- a first portion engageable with a generally radially inwardly facing surface of said vehicle wheel; and
- a second portion engageable with another portion of said vehicle wheel and cooperating therewith to increase the force of engagement between said first portion and said vehicle wheel, one of said first and second portions including radially extending circumferentially spaced lateral edge portions engageable with said vehicle wheel, said first portion cooperating with said second portion to aid in urging said edge portions into engagement with said vehicle wheel so as to resist relative rotational movement therebetween.

8. A retention system as set forth in claim 7 wherein each of said anti-rotation clips further includes means for axially positioning the peripheral edge of said wheel trim with respect to said vehicle wheel.

9. A retention system as set forth in claim 8 wherein said axial positioning means is located axially inwardly of said first and second portions.

10. A retention system as set forth in claim 9 wherein each of said anti-rotation clips include a cam surface extending generally between and interconnecting said positioning means and said first portion, said cam surface being operative to facilitate installation of said wheel trim on said vehicle wheel.

11. An anti-rotation clip adapted to be secured to a wheel trim and to cooperate therewith to inhibit relative rotation of said wheel trim with respect to a vehicle wheel when said trim member is installed thereon, said anti-rotation clip comprising first and second resiliently spaced portions engageable with generally opposed spaced surfaces of a vehicle wheel and adapted to be compressed therebetween, said second portion including radially extending flared circumferentially spaced lateral edge portions engageable with said vehicle wheel, said first portion operating to increase the force of engagement of said edge portions with said vehicle wheel to resist relative rotation of said trim with respect to said wheel and axial positioning means positioned between and interconnecting said first and second portions and being engageable with said vehicle wheel for positioning the peripheral edge of said wheel trim with respect to said vehicle wheel.

12. A clip as set forth in claim 11 wherein said anti-rotation clip further comprises a cam surface engageable with said wheel and operative to facilitate movement of at least one of said first and second portions into an installed compressed relationship with respect to said vehicle wheel.

13. A clip as set forth in claim 11 wherein said anti-rotation clip includes opposite end portions, one of said end portions being secured to said wheel trim.

14. A clip as set forth in claim 13 wherein said first and second portions are located intermediate said opposite end portions.

* * * * *

UNITED STATES PATENT AND TRADEMARK OFFICE
CERTIFICATE OF CORRECTION

PATENT NO. : 4,749,234
DATED : June 7, 1988
INVENTOR(S) : Heinrich J. Hempelmann It is certified that error appears in the above-identified patent and that said Letters Patent is hereby corrected as shown below:

Column 2, line 14, "damming" should be -- camming --.

Column, 2, line 33, "locking" should be -- looking --.

Column 3, line 45, "spaced" should be -- spacing --.

Column 4, line 6, "tirm" should be -- trim --.

Column 4, line 24 (first occurrence), "of" should be -- or --.

Signed and Sealed this

Eighteenth Day of July, 1989

Attest:

DONALD J. QUIGG

*Attesting Officer*  *Commissioner of Patents and Trademarks*